United States Patent
Day

[11] Patent Number: 5,961,918
[45] Date of Patent: Oct. 5, 1999

[54] TRIANGULAR CELL METAL FILTERS

[75] Inventor: J. Paul Day, Big Flats, N.Y.

[73] Assignee: Corning Incorporated, Corning, N.Y.

[21] Appl. No.: 08/828,609

[22] Filed: Mar. 31, 1997

Related U.S. Application Data

[60] Provisional application No. 60/017,948, May 20, 1996.
[51] Int. Cl.$^6$ ....................................................... C22B 9/02
[52] U.S. Cl. ........................ 266/227; 210/510.1; 55/523; 55/DIG. 5; 264/DIG. 48; 75/407
[58] Field of Search ........................ 210/510.1; 266/227; 55/523, DIG. 5, DIG. 30; 264/DIG. 48; 75/407; 422/180

[56] References Cited

U.S. PATENT DOCUMENTS

| | | |
|---|---|---|
| 3,910,770 | 10/1975 | Kobylinksi et al. . |
| 4,283,210 | 8/1981 | Mochida et al. . |
| 4,335,023 | 6/1982 | Dettling et al. . |
| 4,416,676 | 11/1983 | Montierth . |
| 4,420,316 | 12/1983 | Frost et al. . |
| 4,504,392 | 3/1985 | Groteke . |
| 4,671,498 | 6/1987 | Uram . |
| 4,681,624 | 7/1987 | DeAngelis et al. . |
| 5,070,588 | 12/1991 | Miwa et al. . |
| 5,104,540 | 4/1992 | Day et al. . |
| 5,281,462 | 1/1994 | Day et al. . |
| 5,306,457 | 4/1994 | Lipp . |
| 5,308,568 | 5/1994 | Lipp . |

FOREIGN PATENT DOCUMENTS

| | | |
|---|---|---|
| 0 043 694 | 1/1982 | European Pat. Off. . |
| 0 206 535 | 12/1986 | European Pat. Off. . |
| 35 09 113 A1 | 9/1986 | Germany . |

*Primary Examiner*—Robert J. Popovics
*Attorney, Agent, or Firm*—Kees van der Sterre

[57] ABSTRACT

Honeycomb filters for the filtration of molten metal streams comprise a triangular cell cross-section in combination with specified cell density, cell wall thickness, filter open frontal area and geometric surface area, thereby offering improved filtration performance when compared with similar filters of square or circular cell design.

2 Claims, 1 Drawing Sheet

5,961,918

TRIANGULAR CELL METAL FILTERS

This application claims the benefit of U.S. Provisional Application No. 60/017,948 filed May 20, 1996, entitled TRIANGULAR CELL METAL FILTERS, by J. Paul Day.

BACKGROUND OF THE INVENTION

The present invention relates to cellular ceramic structures useful as filters for the casting of metal parts. The filters function to remove debris from a molten metal stream as it is cast into a mold, so that castings free of inclusions affecting the strength, homogeneity, performance, durability and/or appearance of the finished cast parts may be produced.

One type of molten metal filter for this use consists of a ceramic honeycomb body comprising a multiplicity of parallel through-channels through which a molten metal is to be cast. Examples of molten metal filters of this type are disclosed in U.S. Pat. Nos. 4,681,624, 5,281,462 and 5,104,540. In general, filters made in accordance with those patents are made by extrusion of a plasticized ceramic or mineral batch through a honeycomb die to form a green honeycomb shape, followed by firing of the green honeycomb to produce a strong, refractory channeled body having good filtration efficiency. As noted in U.S. Pat. No. 4,681,624, the honeycomb may in principle comprise any structure which has substantially parallel open channels, or longitudinally-extending cells, therethrough defined by relatively thin separator walls and in which the transverse cross-sectional configuration of the channels or cells is of any rounded (i.e., circular or elliptical) or polygonal (i.e., triangular, rectangular, hexagonal) shape. Ceramic compositions which may be used included zircon and zircon-containing compositions, as well as compositions of alumina, mullite, zirconia, spinel, cordierite, other aluminosilicates, aluminates, and titanates such as aluminum titanate.

At present, current extruded honeycomb molten metal filters of approximately 100 or 200 square-channel cell density, i.e., filters incorporating 100 or 200 square cpsi (cells per square inch) of filter frontal surface area, manufactured by honeycomb extrusion as described in the foregoing patents, are commercially employed. In general, these are considered have filtration efficiencies very similar to those of pressed ceramic filters of similar cell density. The latter filters are made from fired pressings of ceramic precursor materials rather than from extruded honeycombs of those materials, and they typically incorporate round rather than the conventional square channel or cell openings.

Although flow rates through the extruded square-cell honeycombs appear to be slightly higher than the pressed round-cell honeycombs under the same casting conditions (e.g., metal type, metal head, etc.), this faster flow characteristic is not a practical advantage at the casting rates currently prevalent in the industry. However, improvements in filter design which could provide better filtration, i.e., the ability to remove smaller debris from the molten metal stream, would be of substantial value in the industry, particularly if such an improvement could be obtained at similar cost and without any reductions in permissible casting rates.

SUMMARY OF THE INVENTION

The present invention provides an extruded metal filter of improved design which offers significantly improved filtering efficiency without substantially reducing metal flow rate therethrough The improved filter of the invention is an extruded honeycomb filter of generally triangular, rather than square or circular, cell cross-section.

In the prior art, no performance distinctions had been recognized on the basis of cell cross-sectional shape, all cross-sections being considered substantially equivalent from the standpoint of filter performance and filtration efficiency. Unexpectedly, it has now been found that, if appropriate limitations on cell density, cell wall thickness, filter open frontal area and specific surface area are observed, triangular-celled molten metal filters offering significantly improved filtration performance can be provided.

More particularly, the invention includes a ceramic honeycomb molten metal filter having a triangular cell cross-section, a cell density in the range of 80–160 triangular cells/in$^2$ of filter frontal area, and a channel length in the range of about 0.3–0.8 inches. The channel wall thickness of the filter will be in the range of 0.009–0.019 inches, with filter open frontal area ranging 60–75%.

Preferably, the geometric variables of the filter design will be selected to provide a filter geometric surface area (the aggregate surface area of all of the walls of all of the channels) in the range of 32–50 in$^2$ per in$^3$ of filter volume. Channel hydraulic diameter for each of the triangular channels will be in the range of 0.055–0.085 inches. Within these design limits it has been found that filters having better filtration efficiency than prior art filters of square or circular cell design, with metal flow and other filtration properties substantially equivalent to the prior art filters, may be provided.

DESCRIPTION OF THE DRAWING

The invention may be further understood by reference to the Drawing, wherein.

DETAILED DESCRIPTION

Figure 1:
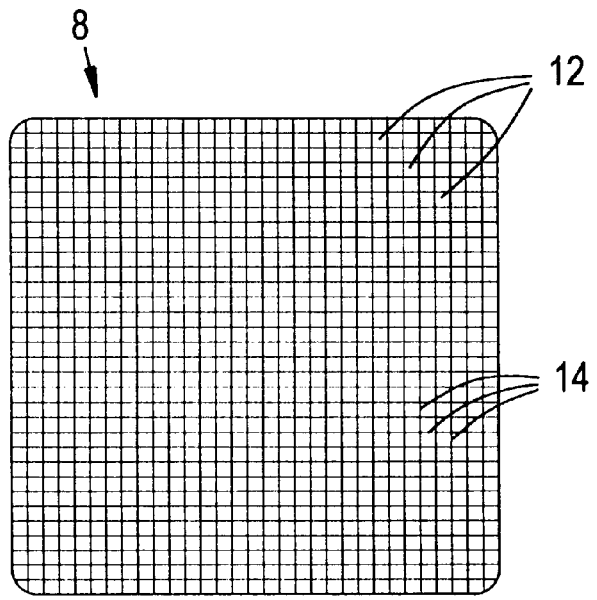
FIG. 1 is an extruded honeycomb metal casting filter in accordance with the prior art.

Referring more particularly to the drawing, FIG. 1 shows a structure typical of prior art filters, these generally comprising channels or cells 12 of square (or round) cross-section traversing a ceramic filter body 8 of approximately 2 cm or less thickness. The cell density of such filters varies, but typically falls in the range of 14–17 cells/cm$^2$ (90–110 cells/in$^2$) of filter frontal area. The thicknesses of the cell walls 14 also vary. However, in the case of extruded ceramic filters of square-celled design, cell wall thicknesses are generally in the range of 0.25–0.75 mm (0.010–0.030 in).

Figure 2:
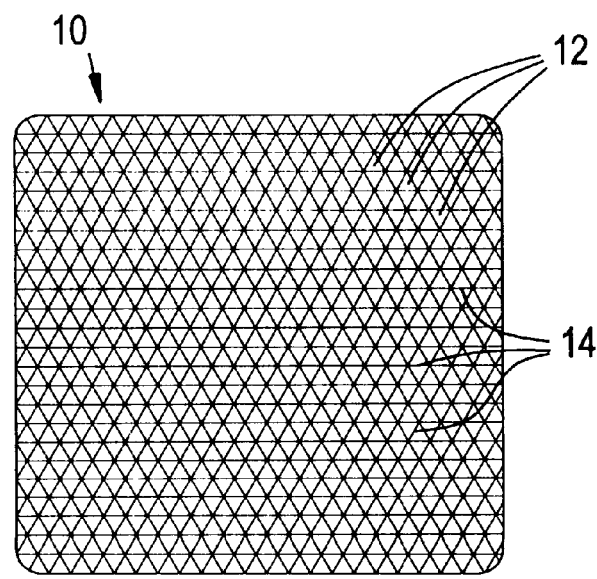
FIG. 2 is an extruded honeycomb metal casting filter of triangular-cell cross section provided in accordance with the invention.

FIG. 2 of the drawing shows a typical design for a triangular-cell filter provided in accordance with the invention. In that Figure, filter 10 comprises a plurality of triangular cells consisting of triangular channels 12 separated by cell walls 14.

While not intending to be bound by theory, the improvements in filtration efficiency obtained in accordance with the invention are presently considered to result from a combination of at least two factors. First, the particular ranges of cell size and cell wall thickness adhered to in the practice of the invention are such as to achieve controlled reductions in the hydraulic diameter of the cells which do not incur significant reductions in the open frontal area (OFA) of the filters. Secondly, the triangular cross-sectional geometry of the cells appears to be more effective in trapping and removing certain classes of debris inclusions from molten metal casting streams than the square or round cross-sectional cell geometries of prior art designs.

The most significant improvements in filter performance over both square-celled extruded honeycomb filters and round-celled pressed ceramic filters appear to be best attainable within the most preferred limits of triangular cell honeycomb filter design set out in Table I below:

TABLE I

Triangular Cell Filter Designs

| | |
|---|---|
| Cell density: | 90–150 triangular cpsi |
| Filter depth: | 0.3–0.8 inches |
| Filter OFA: | 60–70% |
| Filter wall thickness: | 0.012–0.018 inches |
| Cell hydraulic diameter: | 0.065–0.080 inches |
| Filter unit surface area: | 34–42 in$^2$/in$^3$ |

Overall filter size will of course vary depending upon the size of the metal casting stream, but achieving the proper balance of filter volume and filter geometric surface area (the collective surface area of the filter channel walls), corresponding to Filter unit surface area as reported in the above Table, is quite important in achieving the desired improvements in filtration efficiency, as hereinafter more fully described.

From back pressure equations developed to model fluid flow through channeled or honeycomb cellular structures, the following equation for the flow rate through a honeycomb filter has been derived:

$$Q = \frac{D_h^4 N}{t} S$$

where Q is the flow rate, $D_h$ is the hydraulic diameter, N is the cell density in cells per unit filter frontal area, t is the filter depth or length of the filter through-channels, and S is a constant related to the cell shape and other fixed parameters.

Table II below sets forth data comparing filter parameters for illustrative triangular-cell extruded honeycomb filters designed in accordance with the invention with corresponding parameters for an extruded commercial square-cell honeycomb filter and a pressed ceramic round-cell filter product of the prior art. One of the triangular-cell filters had the same cell density (90 cpsi) as the prior art filters, while the other had a slightly higher (96 cpsi) cell density. Also reported for each of the extruded honeycomb filters are the cell wall thickness T and geometric surface area GSA.

TABLE II

Comparative Filter Parameters

| | Triangular Cell Filters | | Square Cell Filter | Round Cell Filter |
|---|---|---|---|---|
| S | 4.87 | 4.87 | 3.52 | 2.45 |
| N (cpsi) | 90 | 96 | 90 | 90 |
| Dh (in) | 0.075 | 0.0738 | 0.0854 | 0.0899 |
| t (in) | 0.493 | 0.493 | 0.493 | 0.500 |
| Q | 0.0281 | 0.0281 | 0.0342 | 0.0282 |
| OFA (%) | 65.7 | 68.0 | 65.7 | 56.0 |
| T (in) | 0.0175 | 0.0158 | 0.020 | — |
| GSA (in$^2$/in$^3$) | 35.1 | 36.8 | 30.8 | — |

As is apparent from the data set forth in Table II, triangular-cell filters designed in accordance with the invention, such as shown in the first two columns of the Table, offer substantially the same flow rate under standard casting conditions as a typical pressed round-cell filter part of the same cell density. At the same time, it offers the same open frontal area and thickness as the commercial extruded square-cell filter of the same cell density.

Although the similarities in flow rate, open frontal area and filter depth would have suggested that filtration performance for the triangular-cell filters would have been substantially equivalent to the performance of the prior art filters, significantly higher filtration efficiency than either of the prior art products is instead observed. This higher efficiency is attributed principally to the decreased hydraulic diameter and increased cell side-wall surface area of the selected triangular-cell design. In fact, calculations indicate that the triangular-cell filter designs of Table II should have about the same filtration efficiency as a commercial extruded square-cell filter of 150 cells/in$^2$ design, even though the latter filter will have a lower flow rate under similar casting conditions.

Honeycomb filters provided in accordance with the invention may be made by any of the methods known in the art for the production of honeycomb shapes from refractory ceramic materials. Such methods include the direct extrusion of the honeycomb shape, or ceramic casting or pressing processes which can produce such shapes from appropriate molds.

The honeycomb filters provided by these methods typically comprise a multiplicity of parallel open through-channels extending from one face of the body to the other, formed by the intersecting interconnected walls formed of the extruded ceramic material. The material used to form the honeycombs may comprise any ceramic material having the thermal and chemical properties necessary for use in a flowing molten metal environment. A number of these materials are described in U.S. Pat. Nos. 4,681,624 and 5,281,462, and those patents are expressly incorporated herein by reference for a further description of these materials and the methods by which they are useful for metal filter fabrication.

Foundry trials with triangular-cell metal filters, carried out under the auspices of Foseco, Inc., Cleveland, Ohio, confirm substantial improvements in filtration efficiency over square-cell filters of similar cell density. As measured by slag scrap results, i.e., the incidence of reject castings due to slag inclusions arising from inadequate filtration, castings made using a 110-triangular-cell filter design exhibited scrap levels which were less than 25% of the scrap levels incurred using standard commercial 100-square-cell filters. Preliminary foundry trials with 150-triangular-cell filters for specialized ductile iron castings have also produced promising results, particularly when compared with the results achieved using commercial 200-square-cell extruded or 20 ppi (pores per inch) ceramic foam filters.

As noted above, the improved filtration efficiency of the triangular-cell filters of the invention is believed to have two origins: the smaller hydraulic diameter of the filter channels and the higher geometric surface area of those channels. The smaller corner angles of the triangular cells may also play an important role. The performance of these filters can perhaps be better understood from an analysis of the three primary means of molten metal filtration operative in these filters, i.e., 1) sieving; 2) cake filtration; and 3) surface energy reduction.

Sieving is simply the prevention of a particle from passing through a channel which is smaller than itself. Particles encountered in molten metal casting are not necessarily spherical in shape. In the case of ductile iron, many of the particles are in the shape of strings which drape over some number of cells. As the hydraulic diameter is reduced, the size of the particle or string which is trapped on the front face of the filter is reduced. While maintaining the flow resistance of the pressed round-cell filter and the mass and open frontal area of the extruded square-cell filter, the hydraulic diameter of the triangular-cell filter is reduced by about 15%. The effect is an increase in the number and a decrease in the size of the particles which are trapped on the front face of the filter by sieving.

Cake filtration occurs after the first particles are trapped on the front face of a filter and subsequent slag and dross accumulate on these particles. Since, in the filters of the invention, the size of the smallest particles which are trapped decreases (due to smaller hydraulic diameter), and more particles are then trapped earlier in the casting process, the number of trapped particles increases and the onset of cake filtration is accelerated.

The variable of channel surface area is important since the surface energy of oxide particles in a metal melt is very high, and these particles are therefore attracted to oxide surfaces because attachment to these surfaces will reduce the overall energy of the system. The higher geometric surface area of a typical triangular-cell filter of the invention (in excess of 34 $in^2/in^3$), compared to extruded square-cell (30.8 $in^2/in^3$) and pressed round-cell (24.9 $in^2/in^3$) of the same cell density, will attract and trap more of the small particles entering the channels. Beyond the gross effect of increased surface area, an added benefit of the triangular cell design is the set of sharp corners in each cell, whereby surface energy is reduced by a particle coming into contact with two sides of the cell instead of just one in the case of the round cell.

I claim:

1. A ceramic honeycomb molten metal filter having a triangular cell cross-section, a cell density in the range of 80–160 triangular cells/$in^2$ of filter frontal area, a channel length in the range of about 0.3–0.8 inches, a filter unit surface area in the range of 32–50 $in^2/in^3$, a channel hydraulic diameter in the range of 0.055–0.085 inches, a cell wall thickness in the range of 0.009–0.019 inches, and a percent open frontal area in the range of 60–75%.

2. A filter in accordance with claim 1 having a cell density in the range of 90–150 cells/$in^2$, a filter unit surface area in the range of 34–42 $in^2/in^3$, a channel hydraulic diameter in the range of 0.065–0.080 inches, a cell wall thickness in the range of 0.012–0.018 inches, and a percent open frontal area in the range of 60–70%.

* * * * *